United States Patent
Aziz

(10) Patent No.: US 9,165,460 B2
(45) Date of Patent: Oct. 20, 2015

(54) PEDESTRIAN WARNING LIGHT SYSTEM FOR VEHICLES WITH ILLUMINATION IN DIFFERENT DIRECTIONS

(71) Applicant: Basem Albert Aziz, Edmonton (CA)

(72) Inventor: Basem Albert Aziz, Edmonton (CA)

(*) Notice: Subject to any disclaimer, the term of this patent is extended or adjusted under 35 U.S.C. 154(b) by 101 days.

(21) Appl. No.: 14/138,835

(22) Filed: Dec. 23, 2013

(65) Prior Publication Data
US 2015/0179063 A1 Jun. 25, 2015

(51) Int. Cl.
*G08B 21/00* (2006.01)
*G08G 1/005* (2006.01)
*B60Q 1/26* (2006.01)
*G08G 1/16* (2006.01)

(52) U.S. Cl.
CPC *G08G 1/005* (2013.01); *B60Q 1/26* (2013.01); *G08G 1/166* (2013.01)

(58) Field of Classification Search
CPC .................................................. G08G 1/005
USPC .................. 340/944, 438, 435, 468; 701/301
See application file for complete search history.

(56) References Cited

U.S. PATENT DOCUMENTS

| | | | |
|---|---|---|---|
| 4,013,996 A | 3/1977 | Hubbard |
| 4,104,614 A | 8/1978 | Litman |
| 4,115,757 A | 9/1978 | Blahunka |
| 4,631,516 A | 12/1986 | Clinker |
| 4,956,632 A | 9/1990 | Perrigo |
| 5,504,472 A | 4/1996 | Wilson |
| 6,511,216 B2 | 1/2003 | Strickland |
| 6,731,202 B1 | 5/2004 | Klaus |
| 7,038,593 B2 | 5/2006 | Pederson |
| 7,106,185 B1 | 9/2006 | Neufeglise |
| 7,541,918 B1 | 6/2009 | Rizzi |
| 7,705,720 B2 | 4/2010 | Jachmann |
| 2009/0134987 A1 | 5/2009 | Oltmann et al. |
| 2011/0128161 A1 | 6/2011 | Bae et al. |

FOREIGN PATENT DOCUMENTS

| | | |
|---|---|---|
| CA | 2168598 | 8/1997 |
| CA | 2347799 A1 | 5/2000 |
| CA | 2323260 A1 | 4/2001 |
| CA | 2461220 A1 | 9/2005 |
| CA | 2682479 A1 | 10/2008 |
| CA | 2638696 A1 | 2/2009 |

OTHER PUBLICATIONS http://www.aliexpress.com/store/product/8-1W-Car-LED-Warning-light-windshield-light-lamp-Vehicle-dashboard-strobe-Flashlight-Blue-Red-light/500604_575377665.html.

*Primary Examiner* — Jeffery Hofsass

(57) ABSTRACT

A pedestrian-warning light system for a vehicle is disclosed herein. The pedestrian-warning light system includes a sensing device mountable with respect to a vehicle and operable to detect a pedestrian within a zone adjacent to the front of the vehicle. The zone extends along a first axis. The sensing device is operable to emit a detection signal in response to the pedestrian being in the zone. The pedestrian-warning light system also includes a lighting arrangement mountable within the vehicle and operable to concurrently emit light into the vehicle and away from the vehicle in a first direction toward the zone and away from the vehicle in a second direction at least partially opposite to the first direction away from the zone. The pedestrian-warning light system also includes a controller mountable with respect to the vehicle and operable to receive the detection signal from the sensing device and in response actuate the lighting arrangement for warning the pedestrian, and a driver of the vehicle, and drivers of other vehicles.

20 Claims, 3 Drawing Sheets

PEDESTRIAN WARNING LIGHT SYSTEM FOR VEHICLES WITH ILLUMINATION IN DIFFERENT DIRECTIONS

BACKGROUND OF THE INVENTION

1. Field of the Invention

The invention relates to pedestrian detection systems for vehicles.

2. Description of Related Prior Art

U.S. Pub. No. 2011/0128161 discloses a VEHICULAR WARNING DEVICE FOR PEDESTRIANS. The pedestrian warning system of the '161 publication includes a sensing device that is provided on the vehicle for detecting a pedestrian within a predetermined zone around the vehicle. A warning device on the vehicle generates a warning signal perceived by the pedestrian outside the vehicle indicating a presence of the vehicle. A speed sensor senses a speed of the vehicle. A controller is configured to receive a signal from the sensing device indicating the detection of the pedestrian within the predetermined zone. The controller determines whether the speed of the vehicle is within a predetermine speed range. The controller actuates the warning device for warning the pedestrian of the close proximity to the vehicle in response to determining the vehicle traveling at a respective speed is within the predetermined speed range and detecting the presence of the pedestrian within the predetermined zone.

SUMMARY OF THE INVENTION

In summary, the invention is a pedestrian-warning light system for a vehicle is disclosed herein. The pedestrian-warning light system includes a sensing device mountable with respect to a vehicle and operable to detect a pedestrian within a zone adjacent to the front of the vehicle. The zone extends along a first axis. The sensing device is operable to emit a detection signal in response to the pedestrian being in the zone. The pedestrian-warning light system also includes a lighting arrangement mountable within the vehicle and operable to concurrently emit light into the vehicle and away from the vehicle in a first direction toward the zone and away from the vehicle in a second direction at least partially opposite to the first direction away from the zone. The pedestrian-warning light system also includes a controller mountable with respect to the vehicle and operable to receive the detection signal from the sensing device and in response actuate the lighting arrangement for warning the pedestrian, and a driver of the vehicle, and drivers of other vehicles.

BRIEF DESCRIPTION OF THE DRAWINGS

The detailed description set forth below references the following drawings.

DETAILED DESCRIPTION OF EXEMPLARY EMBODIMENTS

Figure 1:
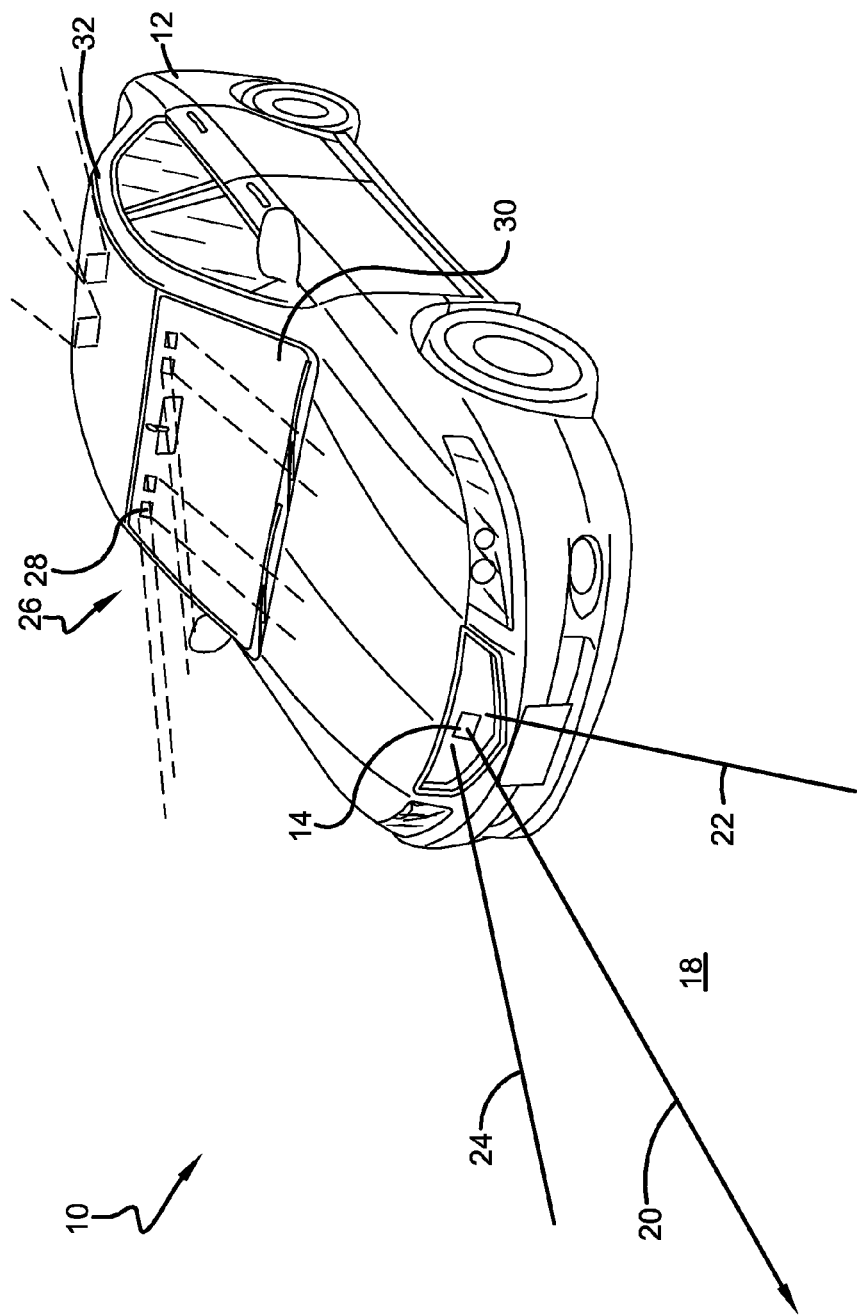
FIG. 1 is a perspective view of an exemplary embodiment of the invention in operation.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing generally share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiments described below, can provide a signal device for drivers to give pedestrians safety and allow them to cross the road and as well warn other drivers that pedestrians are crossing the road. One or more embodiments of the invention can be put in vehicles at the top corners of the windshield and the rear window of the vehicle. As well, one or more embodiments can be applied to big trucks and rigs. The device can be activated by a push button located either on the steering wheel or on the dash board of the car. This will cause the lights to flash to warn drivers that a pedestrian is crossing the road similar to the cross walk lights located in some intersections. The device can either be turned off manually or automatically, such as within 30 seconds. The device will help society prevent further injuries to our youths and children.

FIG. 1 is a perspective view of an exemplary embodiment of the invention in operation. An exemplary pedestrian-warning light system 10 for a vehicle 12 includes a sensing device 14 mountable with respect to a vehicle 12. The sensing device 14 is operable to detect a pedestrian 16 within a zone 18 adjacent to the front of the vehicle 12. The zone 18 extends along a first axis 20. In FIG. 1, lines 22 and 24 reference boundaries of the exemplary zone 18. Alternative embodiments may form zones of other shapes and configurations. The sensing device 14 is operable to emit a detection signal in response to the pedestrian 16 being in the zone 18.

A lighting arrangement 26 is mountable within the vehicle 12. The lighting arrangement 26 is operable to concurrently emit light in more than one direction. The lighting arrangement 26 is operable to emit light into the vehicle 12. For example, a light device 28 of the lighting arrangement can be positioned such that part of the light emitted by the light device 28 reflects off of the interior of a windshield 30 of the vehicle 12 and is thus visible to the driver. In other embodiments, the light device 28 can be positioned such that the light diffuses within the vehicle 12 and thereby becomes visible to the driver.

The lighting arrangement 26 is also operable to emit light away from the vehicle 12 in a first direction toward the zone 18. The light can be directed through the windshield 30. This allows the pedestrian 16 to see the light. The light emitted within the interior of the vehicle 12 and the light emitted through windshield 30 can be generated by the same source or light device, or can be generated by separate devices.

The lighting arrangement 26 is also operable to emit light away from the vehicle 12 in a second direction at least partially opposite to the first direction. The second direction is away from the zone 18. The light away from the zone 18 can be directed through a back window 32 of the vehicle 12. This allows other drivers to see the light. The light emitted within the interior of the vehicle 12 and the light emitted through back window 32 can be generated by the same source or light device, or can be generated by separate devices. Further, an embodiment of the invention can include an arrangement of deflectors such that a single light device could generate the light within the vehicle, the light directed into the zone 18, and the light directed away from the zone 18.

A controller is mountable with respect to the vehicle 12. The controller in the exemplary embodiment shown in FIG. 1 is not visible since the controller is within the vehicle 12, protected from exposure and potential damage. The controller is operable to receive the detection signal from the sensing device 14. In response to receiving the detection signal, the controller can actuate the lighting arrangement 26 for warning the pedestrian 16, and a driver of the vehicle 12, and drivers of other vehicles.

Figure 2:
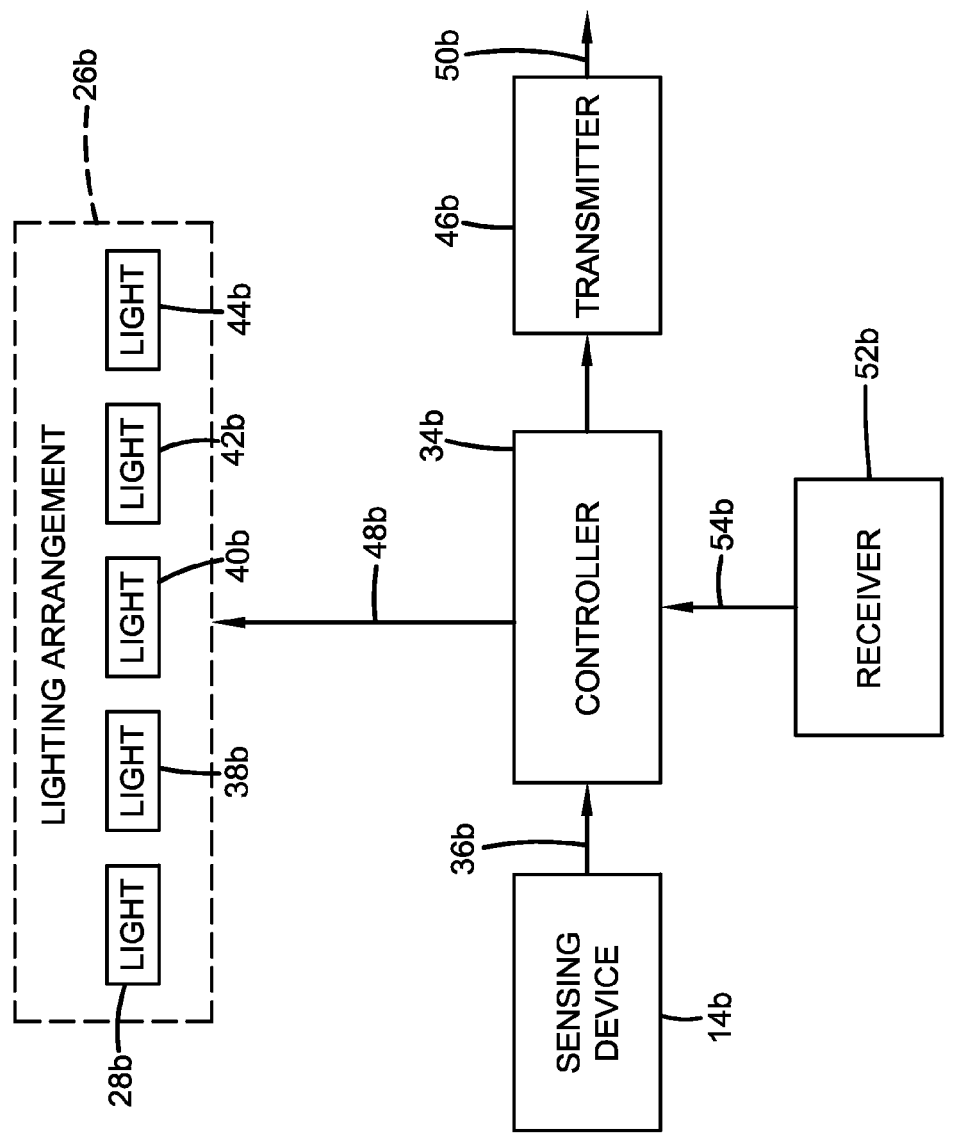
FIG. 2 is a schematic of an electronic portion of one or more exemplary embodiments of the invention.

A controller 34b is operable to receive the detection signal from the sensing device 14b. The communication of the detection signal is schematically referenced at 36b. In response to receiving the detection signal 36b, the controller 34b can actuate the lighting arrangement 26b. The control signal to the lighting arrangement is referenced at 48b. The lighting arrangement 26b can be defined as a plurality of lights or plurality of light devices. FIG. 2 shows exemplary light devices 28b, 38b, 40b, 42b, 44b. The plurality of lights 28b, 38b, 40b, 42b, 44b can be separately mountable with respect to each other (such as shown in FIG. 1), can be mounted together, or can be partially mounted together and partially separately mountable. The controller 34b can be operable to strobe the plurality of lights 28b, 38b, 40b, 42b, 44b in response to receipt of the detection signal. The controller 34b could flash the plurality of lights 28b, 38b, 40b, 42b, 44b sequentially, in selective pairs, or simultaneously.

FIG. 2 also shows that one or more embodiments can include a transmitter 46b in electrical communication with the controller 34b. The controller 34b can be operable to emit an activation signal through the transmitter 46b in response to receipt of the detection signal 36b. The activation signal is schematically referenced at 50b. One or more embodiments can also include a receiver 52b in electrical communication with the controller 34b. The receiver 52b can be operable to receive signals emanating from outside the vehicle and direct received signals to the controller 34b. The communication of a signal from the receiver 52b to the controller 34b is referenced at 54b. The signal received by the receiver 52b can be an activation signal emitted by another embodiment of the invention operating in another vehicle.

Figure 3:
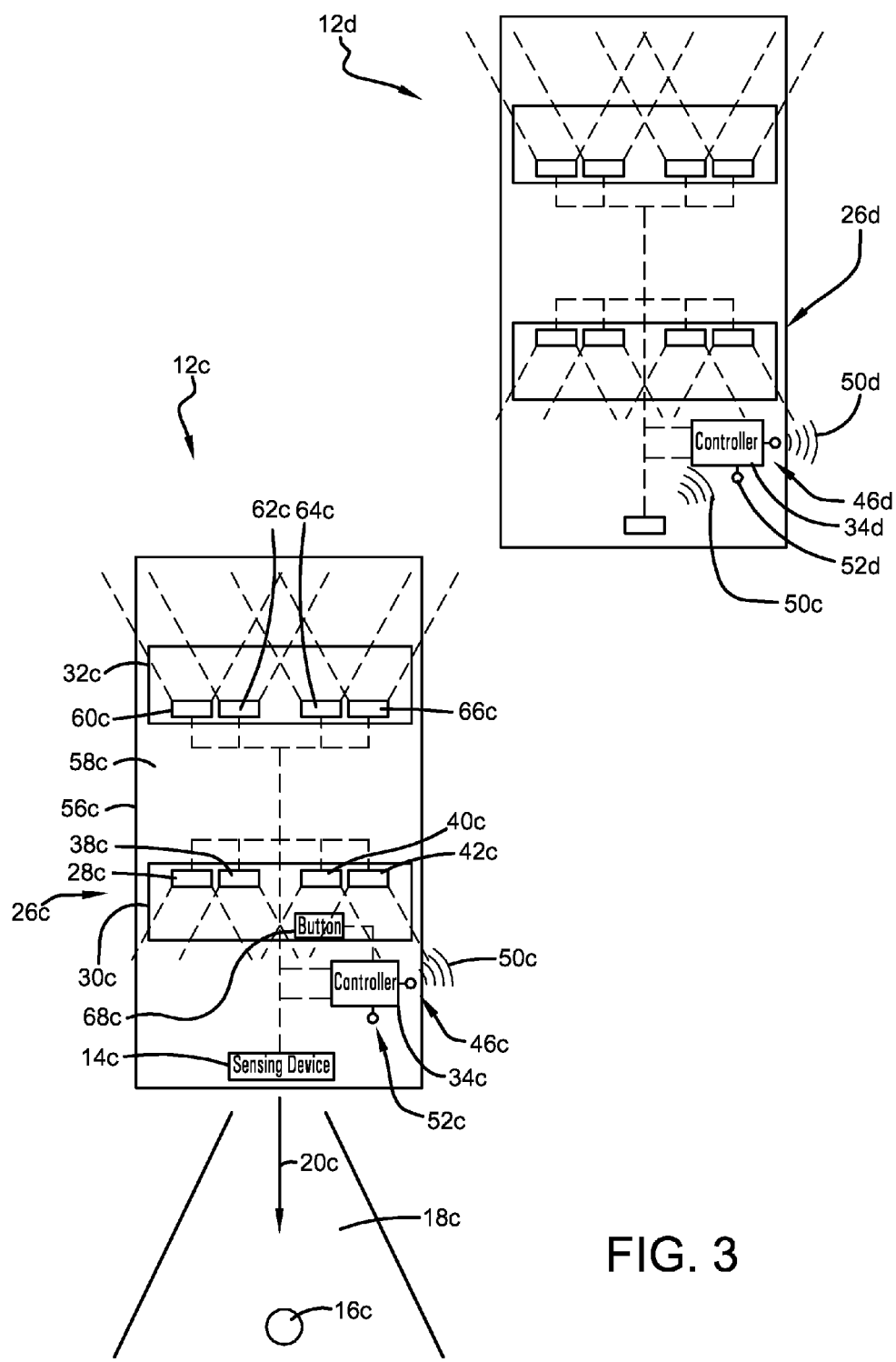
FIG. 3 is a top-down, schematic view of an exemplary embodiment of the invention in operation.

FIG. 3 is a top-down, schematic view of an exemplary embodiment of the invention in operation. A vehicle 12c comprises a body 56c. An interior compartment 58c is defined in the body 56c and at least partially enclosed by a windshield 30c directed forward and a back window 32c opposite the windshield 30c and directed rearward. A sensing device 14c is mounted with respect to the body 56c and operable to detect a pedestrian 16c within a zone 18c adjacent to the front of the body 56c. The zone 18c extends along a first axis 20c. The sensing device 14c is operable to emit a detection signal in response the pedestrian 16c being in the zone 18c.

A lighting arrangement 26c is mountable at least partially within the interior compartment 58c and operable to concurrently emit light into the interior compartment 58c and away from the body 56c in a first direction toward the zone 18 and away from the body 56c in a second direction at least partially opposite to the first direction away from the zone 18. The lighting arrangement 26c includes light devices 28c, 38c, 40c, 42c directed toward the zone 18c. The lights 28c, 38c, 40c, 42c are positioned adjacent to both upper corners of the windshield 30c. The lighting arrangement 26c also includes light devices 60c, 62c, 64c, 66c directed away from the zone 18c. The lights 60c, 62c, 64c, 66c are positioned adjacent to both upper corners of the back window 32c. Any or all of the light devices 28c, 38c, 40c, 42c, 60c, 62c, 64c, 66c can be arranged to also emit light into the interior compartment 58c.

A controller 34c can be mounted with respect to the body 56c and be operable to receive the detection signal from the sensing device 14c. In response to receiving the detection signal, the controller 34c can actuate the lighting arrangement 26c for warning the pedestrian 16c, and a driver of the vehicle 12c, and drivers of other vehicles. A transmitter 46c can be in electrical communication with the controller 34c. The controller 34c can be operable to emit an activation signal through the transmitter 46c in response to receipt of the detection signal. The activation signal is schematically referenced at 50c. A receiver 52c can be mounted with respect to the body 56c and in electrical communication with the controller 34c. The receiver 52b is operable to receive activation signals emanating from outside the vehicle 12c and direct received activation signals to the controller 34c.

The controller can monitor for the receipt of activation signals emanated from outside the vehicle. FIG. 3, a second vehicle 12d carries an embodiment similar to the embodiment carried by the vehicle 12c. A controller 34d can monitor for the receipt of activation signals emanated from outside the vehicle 12d. FIG. 3 shows an exemplary operating environment wherein a receiver 52d is mounted with respect to the vehicle 12d and is in electrical communication with the controller 34d. The receiver 52d receives the activation signal 50c which emanated from outside the vehicle 12d. The receiver 52d directs the received activation signal 50c to the controller 34d.

The controller 34d can actuate the lighting arrangement 26d in response to receipt of the first activation signal 50c. Further, the controller 34d can emit a second activation signal, referenced at 50d with a transmitter 46d in response to receipt of the first activation signal 50c. Thus, all vehicles within the proximate area of the pedestrian 16c are warned of the presence of the pedestrian 16c. The activation signal can be encrypted upon transmission and decrypted upon receipt in order to reduce the likelihood that other signals do not result in actuation of the lighting arrangement.

FIG. 3 also shows that a button 68c positioned in the interior of the vehicle 12c can be used to activate the controller 34c and engage the lighting arrangement 26c. The button 68c can be the main source of activation while the driver is operating the vehicle 12c. This possible embodiment can be desirable if the sensor 14c in the front of the vehicle 12c undesirably turns on when the vehicle 12c is stopped at a red light or stop sign and pedestrians are crossing the street. The button 34c could also be used to temporarily turn off a system that engages automatically. However, the controller 34c can communicate with the other systems in the vehicle 34c, such as the speed detection system and the transmission system. For example, if desired, the controller 34c can be programmed to not engage the lighting arrangement 26c when the vehicle is in drive but not moving.

An exemplary system could monitor a transmission condition of the vehicle. A transmission condition of the vehicle could be reverse, drive, or park. The detection sensor could be arranged to only work when the car is disabled and is in park. Therefore, such an embodiment could detect people or kids passing in front of the car to signal other drivers. An example of when such a system could function is when a child runs in front of the car; other drivers will see that a person is trying to cross the street and drive more cautiously.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A pedestrian-warning light system for a vehicle comprising:
   a sensing device mountable with respect to a vehicle and operable to detect a pedestrian within a zone adjacent to the front of the vehicle wherein said zone extends along a first axis, said sensing device operable to emit a detection signal in response to the pedestrian being in said zone;
   a lighting arrangement mountable within the vehicle and operable to concurrently emit light into the vehicle and away from the vehicle in a first direction toward said zone and away from the vehicle in a second direction at least partially opposite to said first direction away from said zone; and
   a controller mountable with respect to the vehicle and operable to receive said detection signal from said sensing device and in response actuate said lighting arrangement for warning the pedestrian, and a driver of the vehicle, and drivers of other vehicles.

2. The pedestrian-warning light system of claim 1 wherein said lighting arrangement is further defined as a plurality of lights.

3. The pedestrian-warning light system of claim 2 wherein said controller is further defined as operable to strobe said plurality of lights in response to receipt of said detection signal.

4. The pedestrian-warning light system of claim 2 wherein said plurality of lights includes lights separately mountable with respect to each other.

5. The pedestrian-warning light system of claim 1 further comprising:
   a transmitter in electrical communication with said controller, wherein said controller is operable to emit an activation signal through said transmitter in response to receipt of said detection signal.

6. The pedestrian-warning light system of claim 1 further comprising:
   a receiver in electrical communication with said controller, wherein said receiver is operable to receive signals emanating from outside the vehicle and direct received signals to said controller.

7. The pedestrian-warning light system of claim 1 further comprising:
   a transmitter in electrical communication with said controller, wherein said controller is operable to emit an activation signal through said transmitter in response to receipt of said detection signal; and
   a receiver in electrical communication with said controller, wherein said receiver is operable to receive activation signals emanating from outside the vehicle and direct received activation signals to said controller.

8. The pedestrian-warning light system of claim 7 wherein said controller is operable to encrypt activation signals emitted by the transmitter and decrypt activation signals received from the receiver.

9. A vehicle comprising:
   a body;
   an interior compartment defined in said body and at least partially enclosed by a windshield directed forward and a back window opposite said windshield and directed rearward;
   a sensing device mounted with respect to said body and operable to detect a pedestrian within a zone adjacent to the front of said body wherein said zone extends along a first axis, said sensing device operable to emit a detection signal in response to the pedestrian being in said zone;
   a lighting arrangement mountable at least partially within said interior compartment and operable to concurrently emit light into said interior compartment and away from said body in a first direction toward said zone and away from said body in a second direction at least partially opposite to said first direction away from said zone; and
   a controller mounted with respect to said body and operable to receive said detection signal from said sensing device and in response actuate said lighting arrangement for warning the pedestrian, and a driver of the vehicle, and drivers of other vehicles.

10. The vehicle of claim 9 wherein said lighting arrangement is further defined as a plurality of lights including lights positioned adjacent to both upper corners of said windshield.

11. The vehicle of claim 9 wherein said lighting arrangement is further defined as a plurality of lights including lights positioned adjacent to both upper corners of said back window.

12. The vehicle of claim 9 wherein said lighting arrangement is further defined as a plurality of lights including lights positioned adjacent to both upper corners of said windshield and lights positioned adjacent to both upper corners of said back window.

13. The vehicle of claim 12 wherein said controller is further defined as operable to strobe all of said plurality of lights in response to receipt of said detection signal.

14. The vehicle of claim 9 further comprising:
   a transmitter mounted with respect to said body and in electrical communication with said controller, wherein said controller is operable to emit an activation signal through said transmitter in response to receipt of said detection signal; and
   a receiver mounted with respect to said body and in electrical communication with said controller, wherein said receiver is operable to receive activation signals emanating from outside the vehicle and direct received activation signals to said controller.

15. A method of detecting and warning of pedestrians in a roadway comprising the steps of:
   mounting a sensing device in at least one vehicle wherein the sensing devices is operable to detect a pedestrian within a zone adjacent to the front of the vehicle wherein the zone extends along a first axis, the sensing device operable to emit a detection signal in response to the pedestrian being in the zone;
   mounting a lighting arrangement in the at least one vehicle wherein the lighting device is operable to concurrently emit light into the vehicle and away from the vehicle in a first direction toward the zone and away from the vehicle in a second direction at least partially opposite to said first direction away from the zone; and controlling the lighting arrangement with a controller operable to receive the detection signal from the sensing device and in response actuate the lighting arrangement for warning the pedestrian, and a driver of the vehicle, and drivers of other vehicles.

16. The method of claim 15 further comprising:
monitoring a transmission condition of the vehicle; and
wherein said controlling step is further defined as controlling the lighting arrangement so that light is emitted only when the vehicle is in park.

17. The method of claim 15 further comprising the step of:
emitting an activation signal with a transmitter in electrical communication with the controller, wherein the activation signal is emitted in response to receipt of the detection signal by the controller; and
monitoring for activation signals emanated from outside the vehicle with the controller.

18. The method of claim 15 further comprising:
receiving a first activation signal with a receiver in electrical communication with the controller.

19. The method of claim 18 further comprising:
actuating the lighting arrangement with the controller in response to receipt of the first activation signal.

20. The method of claim 19 furthering comprising:
emitting a second activation signal with a transmitter in electrical communication with the controller, wherein the second activation signal is emitted in response to receipt of the first activation signal.

\* \* \* \* \*